(12) United States Patent
Robinson (10) Patent No.: US 12,177,004 B1
(45) Date of Patent: *Dec. 24, 2024

(54) ARTIFICIAL MULTISPECTRAL METADATA GENERATOR

(71) Applicant: Allspring Global Investments Holdings, LLC, Boston, MA (US)

(72) Inventor: Duncan William Wallace Robinson, Sycamore, IL (US)

(73) Assignee: ALLSPRING GLOBAL INVESTMENTS HOLDINGS, LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,911

(22) Filed: Nov. 22, 2022

Related U.S. Application Data (63) Continuation of application No. 16/948,396, filed on Sep. 16, 2020, now Pat. No. 11,552,724.

(51) Int. Cl.
*H04K 1/02* (2006.01)
*G06F 7/58* (2006.01)

(52) U.S. Cl.
CPC .............. *H04K 1/02* (2013.01); *G06F 7/588* (2013.01)

(58) Field of Classification Search
CPC .................................... H04K 1/02; G06F 7/88
See application file for complete search history.

(56) References Cited

U.S. PATENT DOCUMENTS

| | | | |
|---|---|---|---|
| 7,631,195 B1 | 12/2009 | Yu et al. | |
| 7,698,250 B2 | 4/2010 | Dwork et al. | |
| 8,005,821 B2 | 8/2011 | Dwork et al. | |
| 9,846,569 B1 * | 12/2017 | Liu | G06F 7/588 |
| 10,043,036 B1 * | 8/2018 | Dawkins | H04L 9/0618 |
| 10,056,937 B1 | 8/2018 | Neff | |
| 10,121,024 B2 * | 11/2018 | Zhang | G06F 21/60 |
| 10,223,547 B2 | 3/2019 | Rane et al. | |
| 10,225,039 B2 * | 3/2019 | Tollefson | H04K 3/825 |
| 10,439,754 B2 * | 10/2019 | Jeng | H04K 1/04 |
| 10,452,865 B2 | 10/2019 | Wang et al. | |
| 10,834,762 B2 | 11/2020 | Sahlin | |
| 10,885,221 B2 * | 1/2021 | Whitman | G06N 3/08 |

(Continued)

OTHER PUBLICATIONS

"U.S. Appl. No. 16/948,396, Corrected Notice of Allowability mailed Oct. 6, 2022".

(Continued)

*Primary Examiner* — Viral S Lakhia
(74) *Attorney, Agent, or Firm* — K&L GATES LLP (57) ABSTRACT

Various examples are direct to computer-implemented systems and methods for providing an artificial multispectral metadata generator. A method includes receiving, by a computer system, an input data set, and determining attributes of the input data set to be transformed, retained, anonymized, or dropped. For the attributes to be transformed, the computer system generates three or more random noise sets, using at least two noise generation methods. An amalgamated random set is created from the three or more random noise sets using a programmable ratio, and the system uses the amalgamated random set to create an artificial data set that can be used to gain insights from the input data set without having access to the input data set.

20 Claims, 6 Drawing Sheets

(56) References Cited

U.S. PATENT DOCUMENTS

| | | |
|---|---|---|
| 10,936,287 B2 * | 3/2021 | Han .................. G06F 16/51 |
| 10,966,158 B2 | 3/2021 | Dinan |
| 11,241,586 B2 | 2/2022 | Tsai et al. |
| 11,375,482 B2 | 6/2022 | Bergström et al. |
| 11,381,348 B2 | 7/2022 | Baldemair et al. |
| 11,550,547 B2 * | 1/2023 | Sedaghat .................. H03K 3/84 |
| 2006/0053269 A1 | 3/2006 | Yoon et al. |
| 2008/0046493 A1 | 2/2008 | Rosenberg |
| 2010/0162402 A1 | 6/2010 | Rachlin et al. |
| 2011/0002360 A1 | 1/2011 | Chester et al. |
| 2011/0064221 A1 | 3/2011 | McSherry et al. |
| 2013/0238906 A1 | 9/2013 | Khoury |
| 2015/0324604 A1 | 11/2015 | Roy et al. |
| 2016/0117266 A1 | 4/2016 | Anderson |
| 2016/0210463 A1 | 7/2016 | Fawaz et al. |
| 2016/0372127 A1 * | 12/2016 | Chebiyyam ........... G10L 19/002 |
| 2017/0353855 A1 | 12/2017 | Joy |
| 2019/0173518 A1 | 6/2019 | Ataie |
| 2019/0272388 A1 | 9/2019 | Tsou et al. |
| 2019/0294805 A1 | 9/2019 | Taylor et al. |
| 2020/0186971 A1 | 6/2020 | Knebl et al. |
| 2021/0232367 A1 * | 7/2021 | Lamb ..................... G06F 7/588 |
| 2021/0281483 A1 * | 9/2021 | Malpani .................. H04K 1/02 |
| 2021/0399817 A1 | 12/2021 | He et al. |
| 2022/0166586 A1 | 5/2022 | Kundu et al. |

OTHER PUBLICATIONS

"U.S. Appl. No. 16/948,396, Notice of Allowance mailed Sep. 19, 2022".

Narayan, et al., "Verifiable differential privacy", EuroSys, (2015), 14 pgs.

* cited by examiner

ORIGINAL SET

| | NAME | BIRTH_DATE | CUST_AGE | ZIPCODE | TRANSACTION_DATE | AMOUNT |
|---|---|---|---|---|---|---|
| 0 | JONES | 1987-01-01 | 33.292949 | 56745 | 2020-04-15 | 155.67 |
| 1 | ALEPH | 1991-01-23 | 29.232633 | 22355 | 2020-04-15 | 12.23 |
| 2 | WOLF | 1965-04-04 | 55.037407 | 58890 | 2020-04-15 | 45.00 |
| 3 | EINSTEIN | 1955-11-05 | 64.450331 | 54542 | 2020-04-15 | 62.54 |
| 4 | PETERS | 1961-09-12 | 58.596686 | 23233 | 2020-04-15 | 33.33 |
| 5 | MARBURY | 1977-08-14 | 42.675757 | 60604 | 2020-04-15 | 15.24 |
| 6 | AJASHKA | 1988-07-13 | 31.762459 | 60178 | 2020-04-15 | 24.99 |
| 7 | PATRILLO | 1925-08-13 | 94.679562 | 45455 | 2020-04-15 | 45.22 |
| 8 | SPORNACK | 1945-09-15 | 74.588801 | 45455 | 2020-04-15 | 23.25 |
| 9 | DEVARO | 1950-04-29 | 69.969951 | 45455 | 2020-04-15 | 37.62 |
| 10 | NIGHLAND | 1947-07-07 | 72.781782 | 45455 | 2020-04-15 | 21.40 |
| 11 | SLEIGHMAN | 1965-01-23 | 55.231798 | 56745 | 2020-04-15 | 75.83 |
| 12 | GAMBINO | 1963-05-05 | 56.953942 | 56745 | 2020-04-15 | 45.25 |
| 13 | HUBERTS | 1943-02-01 | 77.208978 | 56745 | 2020-04-15 | 254.47 |
| 14 | SMITH | 1985-12-08 | 34.368947 | 22355 | 2020-04-15 | 27.16 |
| 15 | WATSON | 1990-11-30 | 29.380480 | 58890 | 2020-04-15 | 215.83 |
| 16 | KNIGHT | 1981-04-04 | 39.037078 | 54542 | 2020-04-15 | 44.27 |
| 17 | FLOYD | 1969-03-14 | 51.094821 | 23233 | 2020-04-15 | 78.75 |
| 18 | MARLOWE | 1976-08-05 | 43.699734 | 60604 | 2020-04-15 | 90.21 |
| 19 | SPADE | 1973-07-17 | 46.752500 | 60178 | 2020-04-15 | 110.63 |

ARTIFICIAL SET 402 404 404 404

| | NAME_NEW | BIRTH_DATE_NEW | CUST_AGE_NEW | ZIPCODE | TRANSACTION_DATE | AMOUNT_NEW |
|---|---|---|---|---|---|---|
| 0 | 6B1DDC9485 | 1987-01-13 | 33.260094 | 56745 | 2020-04-15 | 156.11 |
| 1 | 27693E7543 | 1991-03-06 | 29.117641 | 22355 | 2020-04-15 | 12.15 |
| 2 | 3E46B630C3 | 1965-03-29 | 55.053834 | 58890 | 2020-04-15 | 45.26 |
| 3 | 524336879E | 1956-03-23 | 64.069762 | 54542 | 2020-04-15 | 62.53 |
| 4 | 5D8CF14A54 | 1961-10-19 | 58.495383 | 23233 | 2020-04-15 | 33.41 |
| 5 | 8E1FC193D3 | 1977-06-24 | 42.815390 | 60604 | 2020-04-15 | 15.12 |
| 6 | B6013A1251 | 1988-06-23 | 31.817217 | 60178 | 2020-04-15 | 25.21 |
| 7 | 7A6046E582 | 1925-07-03 | 94.791816 | 45455 | 2020-04-15 | 45.46 |
| 8 | 4295694357 | 1945-10-11 | 74.517615 | 45455 | 2020-04-15 | 23.58 |
| 9 | 45D9CBF217 | 1950-02-13 | 70.175294 | 45455 | 2020-04-15 | 37.41 |
| 10 | 42A5E0A5FB | 1947-05-09 | 72.943318 | 45455 | 2020-04-15 | 21.21 |
| 11 | E78F48A23E | 1965-01-26 | 55.223584 | 56745 | 2020-04-15 | 75.66 |
| 12 | 0B3B80528E | 1963-08-21 | 56.658248 | 56745 | 2020-04-15 | 45.50 |
| 13 | D26C98520F | 1943-01-07 | 77.277425 | 56745 | 2020-04-15 | 254.44 |
| 14 | BCAFC956A3 | 1986-01-29 | 34.215624 | 22355 | 2020-04-15 | 27.26 |
| 15 | B1983C63A7 | 1990-11-27 | 29.388694 | 58890 | 2020-04-15 | 215.76 |
| 16 | E20025EF91 | 1981-03-09 | 39.108264 | 54542 | 2020-04-15 | 44.31 |
| 17 | F45CF1067B | 1969-03-10 | 51.105772 | 23233 | 2020-04-15 | 78.55 |
| 18 | 731DBFEB5D | 1976-06-28 | 43.803774 | 60604 | 2020-04-15 | 90.13 |
| 19 | B2D0A6FFB9 | 1973-08-24 | 46.648460 | 60178 | 2020-04-15 | 110.54 |

*Fig. 4A*

STATISTICS=0.468, P=0.645
SAME DISTRIBUTIONS (FAIL TO REJECT H0)

| CUST_AGE | CUST_AGE_NEW |
|---|---|
| 33.292949 | 33.260094 |
| 29.232633 | 29.117641 |
| 55.037407 | 55.053834 |
| 64.450331 | 64.069762 |
| 58.596686 | 58.495383 |
| 42.675757 | 42.815390 |
| 31.762459 | 31.817217 |
| 94.679562 | 94.791816 |
| 74.588801 | 74.517615 |
| 69.969951 | 70.175294 |
| 72.781782 | 72.943318 |
| 55.231798 | 55.223584 |
| 56.953942 | 56.658248 |
| 77.208978 | 77.277425 |
| 34.368947 | 34.215624 |
| 29.380480 | 29.388694 |
| 39.037078 | 39.108264 |
| 51.094821 | 51.105772 |
| 43.699734 | 43.803774 |
| 46.752500 | 46.648460 |

STATISTICS=-0.815, P=0.425
SAME DISTRIBUTIONS (FAIL TO REJECT H0)

| AMOUNT | AMOUNT_NEW |
|---|---|
| 155.67 | 156.11 |
| 12.23 | 12.15 |
| 45.00 | 45.26 |
| 62.54 | 62.53 |
| 33.33 | 33.41 |
| 15.24 | 15.12 |
| 24.99 | 25.21 |
| 45.22 | 45.46 |
| 23.25 | 23.58 |
| 37.62 | 37.41 |
| 21.40 | 21.21 |
| 75.83 | 75.66 |
| 45.25 | 45.50 |
| 254.47 | 254.44 |
| 27.16 | 27.26 |
| 215.83 | 215.76 |
| 44.27 | 44.31 |
| 78.75 | 78.55 |
| 90.21 | 90.13 |
| 110.63 | 110.54 |

ARTIFICIAL MULTISPECTRAL METADATA GENERATOR

CROSS-REFERENCE TO RELATED APPLICATION

This application is a continuation of U.S. patent application Ser. No. 16/948,396, filed Sep. 16, 2020, which is incorporated by reference herein in its entirety.

TECHNICAL FIELD

Embodiments described herein generally relate to privacy protection for data sets and, for example and without limitation, to systems and methods for an artificial multispectral metadata generator.

BACKGROUND

A user of data services may encounter situations in which it would be desirable to obtain insights from sensitive data without using the sensitive data itself, to protect the privacy of persons from whom the data is derived.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which:

FIGS. 4A-4B are tables illustrating data sets transformed using an artificial multispectral metadata generator, according to an embodiment.

DETAILED DESCRIPTION

A user of data services may encounter situations in which it would be desirable to obtain insights from sensitive data without using the sensitive data itself. Data generated as a by-product of a company's main business is known as exhaust data. Exhaust data is often purchased by a third party, cleaned and then packaged into formally-vended data products to be consumed commercially by other companies. This alternative data then is used to aid the decision-making process across a spectrum of businesses (market research, macro-economic research, investment research, etc.). Alternative data on consumer transactions originating from bricks-and-mortar retail stores, online retail, travel and hospitality businesses and financial institutions is called transactional data.

A business could potentially derive a great deal of insight over consumer purchasing trends from transactional data. However, this insight must not jeopardize high ethical and legal standards. Specifically, there is a need to comply with GDPR (EU), GLBA (US), and CCPA (CA) regulations The General Data Protection Regulation (GDPR) is a European Union (EU) regulation that protects data and privacy, which has been the model upon which many other foreign entities have based their data protection laws. The Gramm-Leach-Bliley Act (GLBA or the Financial Modernization Act of 1999) is a United States (US) federal regulation that requires financial institutions to explain how they share and protect their customers' private information. The California Consumer Privacy Act (CCPA) is designed to improve privacy rights for the residents of California (CA). By way of example, the European Commission states, "Personal data is information that relates to an identified or identifiable individual. If you cannot directly identify an individual from that information, then you need to consider whether the individual is still identifiable. You should take into account the information you are procession together with all the means reasonably likely to be used by either you or any other person to identify that individual" (Information Commissioner's Office (ICO), What is Personal Data?, Apr. 27, 2020).

Most current random data generators essentially use what is called a Pseudo Random Number Generator (PRNG). A PRNG is an algorithm that produces sequences of random numbers using mathematical formulas. The output of a PRNG is a sequence of numbers that approximates random numbers and their properties. When these PRNGs are tested, their properties are most similar to white noise. Because their sequences are not truly random, there does exist a possibility of reverse engineering the data which would compromise the privacy of the consumers from whom the data was derived.

The present subject matter samples from multispectral noise, annealing the original data to it, to arrive at an artificial data set that is completely different from the original set in terms of uniquely identifiable traits per observation, yet yields the same metadata distributional characteristics and so can be used to derive the same insights in a manner that adheres to the highest ethical and legal standards. The present subject matter allows the user to gain the original data's aggregate data insights without ever needing to see or access the original data.

The present subject matter adds layers of complexity to the random number generation process, including adding other types of noise to the process. The spectral noise components are combined at a programmable ratio (for example 55% pink noise, 25% white noise and 20% violet noise) to add a layer of complexity designed to create the artificial data in a manner that would be extraordinarily difficult, if not impossible, to reverse-engineer. This protects the data privacy and security of the original sensitive data.

In one example, a company XYZ includes "Business Unit A" (BUA) that holds original sensitive data and "Business Unit B" (BUB) is the division that typically distills insights from datasets, creates original research, etc. "Business Unit C" (BUC) is a division of XYZ that acts on the data insights generated by BUB. Using this invention, BUA can run its sensitive data through an artificial multispectral metadata generator of the present subject matter and the output is an artificial dataset which shares no identifiable characteristics with the original dataset, yet still shares the same distributional characteristics. BUA can share the artificial dataset with BUB for BUB to create proprietary research for BUC to use as a component of its decision-making process. In this process, BUA never shares the actual sensitive data with any other entity or division, protecting the privacy of the data in accordance with the current privacy laws.

In various embodiments, a method of the present subject matter receives or selects sensitive data, and determines which attributes must be dropped, anonymized (using random hexadecimal), transformed, or retained. In one embodiment, the method then generates a random pink noise set, a random violet noise set and a random white noise set, in an embodiment. An amalgamated random set is created from these initial random sets using a programmable ratio (for example, 40% pink, 20% white, 40% violet), and the method randomly samples with replacement from this amalgamated set for the noise used to create the artificial data, to obtain a raw noise set. A range of ratios (for example 1 to 98% of each type of noise) can be combined, such that the total amount adds up to 100%, in some embodiments. In various embodiments, a standard deviation of each attribute is used and a low dollar amount for transactions, to obtain a noise base set. The noise base set is multiplied with the raw noise set to arrive at a final noise set for each respective variable, in various embodiments. According to various embodiments, the final noise set is added to the original sensitive data to arrive at a completely new artificial dataset, whose identifying attributes and transactional details are completely different from the original sensitive dataset, yet whose distributional attributes are statistically very similar to the original sensitive dataset.

Figure 1:
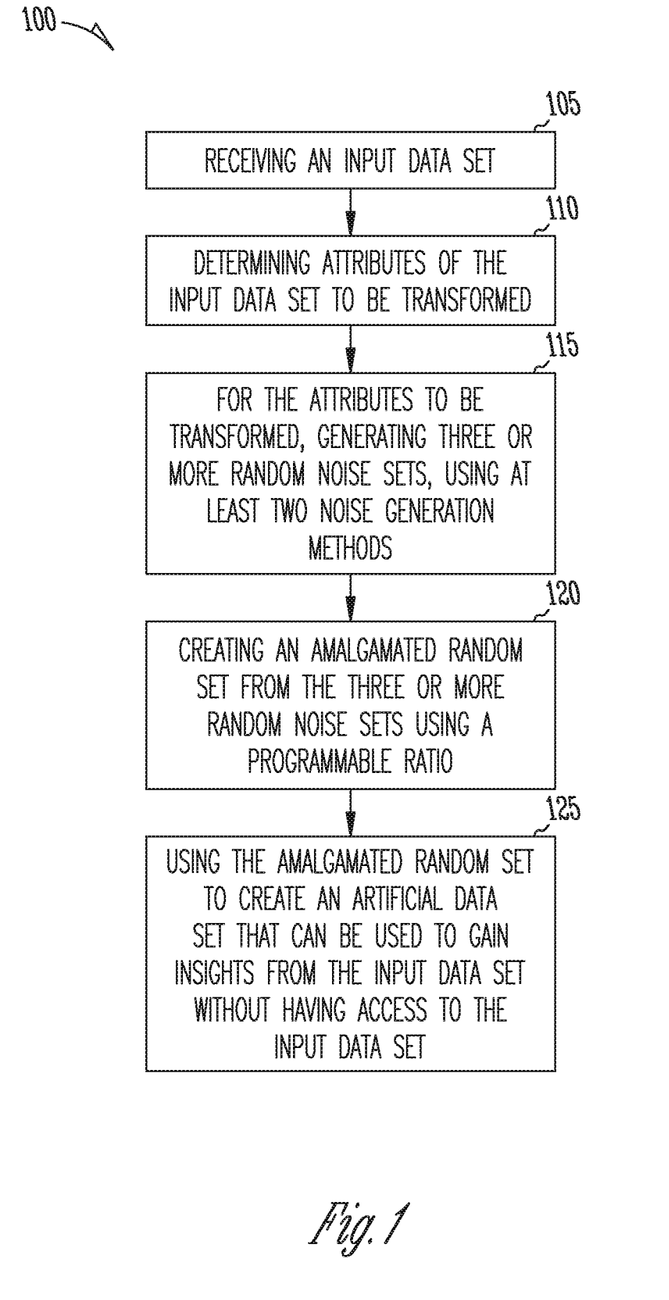
FIG. 1 illustrates an example embodiment of a method for providing an artificial multispectral metadata generator.

FIG. 1 illustrates an example embodiment of a method for providing an artificial multispectral metadata generator. The method 100 includes receiving, by a one or more processors of a computer system, an input data set, at operation 105. At operation 110, the one or more processors of the computer system determines attributes of the input data set to be transformed, retained, anonymized, or dropped. For the attributes to be transformed, the method generates three or more random noise sets, using at least two noise generation methods, at operation 115. Two or more random noise sets can be used without departing from the scope of the present subject matter. The noise generation methods include different spectral noise generation methods, in various embodiments. At operation 120, the one or more processors of the computer system creates an amalgamated random set from the three or more random noise sets using a programmable ratio. In various embodiments, the amalgamated random set to create an artificial data set that can be used to gain insights from the input data set without having access to the input data set, at operation 125. Creating the artificial data set by the one or more processors of the computer system includes randomly sampling from the amalgamated random set to create a raw noise set, using a standard deviation of the attributes to be transformed to create a noise base set, multiplying the noise base set with the raw noise set to obtain a final noise set for the attributes to be transformed, and adding the final noise set to the input data set to obtain an artificial data set, in various embodiments.

According to various embodiments, the at least two noise generation methods include a white noise generator having a power spectral density per unit of bandwidth proportional to $1/f^\beta$, wherein $\beta$ is equal to 0. The at least two noise generation methods include a pink noise generator having a power spectral density per unit of bandwidth proportional to $1/f^\beta$, wherein $\beta$ is equal to 1, in various embodiments. In various embodiments, the at least two noise generation methods include a violet noise generator having a power spectral density per unit of bandwidth proportional to $f^\beta$, wherein $\beta$ is equal to 2. The at least two noise generation methods include a brown noise (also called red noise) generator having a power spectral density per unit of bandwidth proportional to $1/f^\beta$, wherein $\beta$ is equal to 2, in various embodiments. Other noise generation methods using other spectral components can be used without departing from the scope of the present subject matter.

In various embodiments, the noise could be blended to conform to the power laws between the types of noise generation used. For example, a blend of pink ($1/f^1$) and violet ($1/f^2$) could be used (or $1/f^{1.5}$). In some embodiments, two noise sets (with each a unique power spectral density per unit of bandwidth, i.e. one white, one pinkish-violet, etc.) can be used. In other embodiments, one hundred different noise sets with varying spectra can be used.

In various embodiments, for the attributes to be anonymized, a random hexadecimal substitution is used to anonymize the attributes. The programmable ratio is limited to ensure that a percentage from the white noise generator is not greater than another of the at least two noise generation methods, in an embodiment. In various embodiments, randomly sampling from the amalgamated random set includes randomly sampling with replacement from the amalgamated random set. The method further includes using distributional attributes from the final noise set to gain insights from the input data set without having access to the input data set, according to various embodiments. In one embodiment, creating an amalgamated random set from the three or more random noise sets using a programmable ratio includes using a Fibonacci number sequence.

Various embodiments of the present subject matter include a system for providing an artificial multispectral metadata generator. The system includes a computing system comprising one or more processors and a data storage system in communication with the one or more processors. The data storage system includes instructions thereon that, when executed by the one or more processors, causes the one or more processors to receive an input data set, and determine attributes of the input data set to be transformed, retained, anonymized, or dropped. For the attributes to be transformed, three or more random noise sets are generated, using at least two noise generation methods. An amalgamated random set is created from the three or more random noise sets using a programmable ratio, and the amalgamated random set is randomly sampled from to create a raw noise set. A standard deviation of the attributes to be transformed is used to create a noise base set, and the noise base set is multiplied with the raw noise set to obtain a final noise set for the attributes to be transformed. In various embodiments, the final noise set is added to the input data set to obtain an artificial data set. The at least two noise generation methods include two or more of a white noise generator, a pink noise generator, a violet noise generator, or a brown noise generator, in various embodiments.

In various embodiments, a non-transitory computer-readable storage medium is provided. The computer-readable storage medium includes instructions that when executed by computers, cause the computers to perform operations of receiving an input data set, determining attributes of the input data set to be transformed, retained, anonymized, or dropped, for the attributes to be transformed, generating three or more random noise sets, using at least two noise generation methods, creating an amalgamated random set from the three or more random noise sets using a programmable ratio, randomly sampling from the amalgamated random set to create a raw noise set, using a standard deviation of the attributes to be transformed to create a noise base set, multiplying the noise base set with the raw noise set to obtain a final noise set for the attributes to be transformed, and adding the final noise set to the input data set to obtain an artificial data set.

In various embodiments, for the attributes to be anonymized, a random hexadecimal substitution is used to anonymize the attributes. Randomly sampling from the amalgamated random set includes randomly sampling with replacement from the amalgamated random set, in an embodiment. In various embodiments, the method further includes using distributional attributes from the final noise set to gain insights from the input data set without having access to the input data set. Creating an amalgamated random set from the three or more random noise sets using a programmable ratio includes using a Fibonacci number sequence, in an embodiment.

Figure 2:
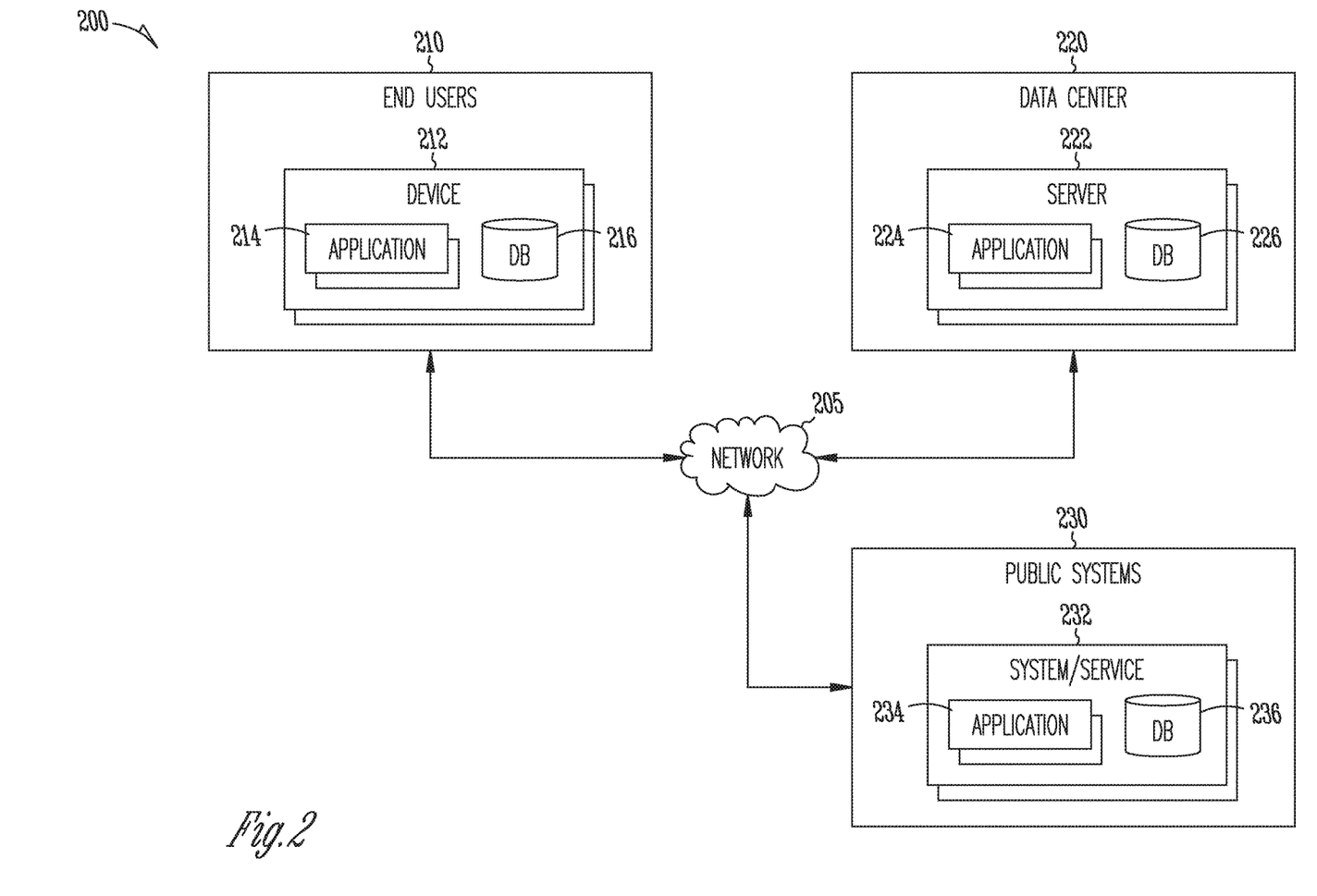
FIG. 2 illustrates an exemplary infrastructure for providing an artificial multispectral metadata generator.

FIG. 2 illustrates an exemplary infrastructure for providing an artificial multispectral metadata generator. The infrastructure may comprise a distributed system 200 that may include a client-server architecture or cloud computing system. Distributed system 200 may have one or more end users 210. An end user 210 may have various computing devices 212, which may be a machine 500 as described below. The end-user computing devices 212 may comprise applications 214 that are either designed to execute in a stand-alone manner, or interact with other applications 214 located on the device 212 or accessible via the network 205. These devices 212 may also comprise a data store 216 that holds data locally, the data being potentially accessible by the local applications 214 or by remote applications.

The system 200 may also include one or more data centers 220. A data center 220 may be a server 222 or the like associated with a business entity that an end user 210 may interact with. The business entity may be a computer service provider, as may be the case for a cloud services provider, or it may be a consumer product or service provider, such as a retailer. The data center 220 may comprise one or more applications 224 and databases 226 that are designed to interface with the applications 214 and databases 216 of end-user devices 212. Data centers 220 may represent facilities in different geographic locations where the servers 222 may be located. Each of the servers 222 may be in the form of a machine(s) 500.

The system 200 may also include publicly available systems 230 that comprise various systems or services 232, including applications 234 and their respective databases 236. Such applications 234 may include news and other information feeds, search engines, social media applications, and the like. The systems or services 232 may be provided as comprising a machine(s) 500.

The end-user devices 212, data center servers 222, and public systems or services 232 may be configured to connect with each other via the network 205, and access to the network by machines may be made via a common connection point or different connection points, e.g. a wireless connection point and a wired connection. Any combination of common or different connections points may be present, and any combination of wired and wireless connection points may be present as well. The network 205, end users 210, data centers 220, and public systems 230 may include network hardware such as routers, switches, load balancers and/or other network devices.

Other implementations of the system 200 are also possible. For example, devices other than the client devices 212 and servers 222 shown may be included in the system 200. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 222.

Figure 3:
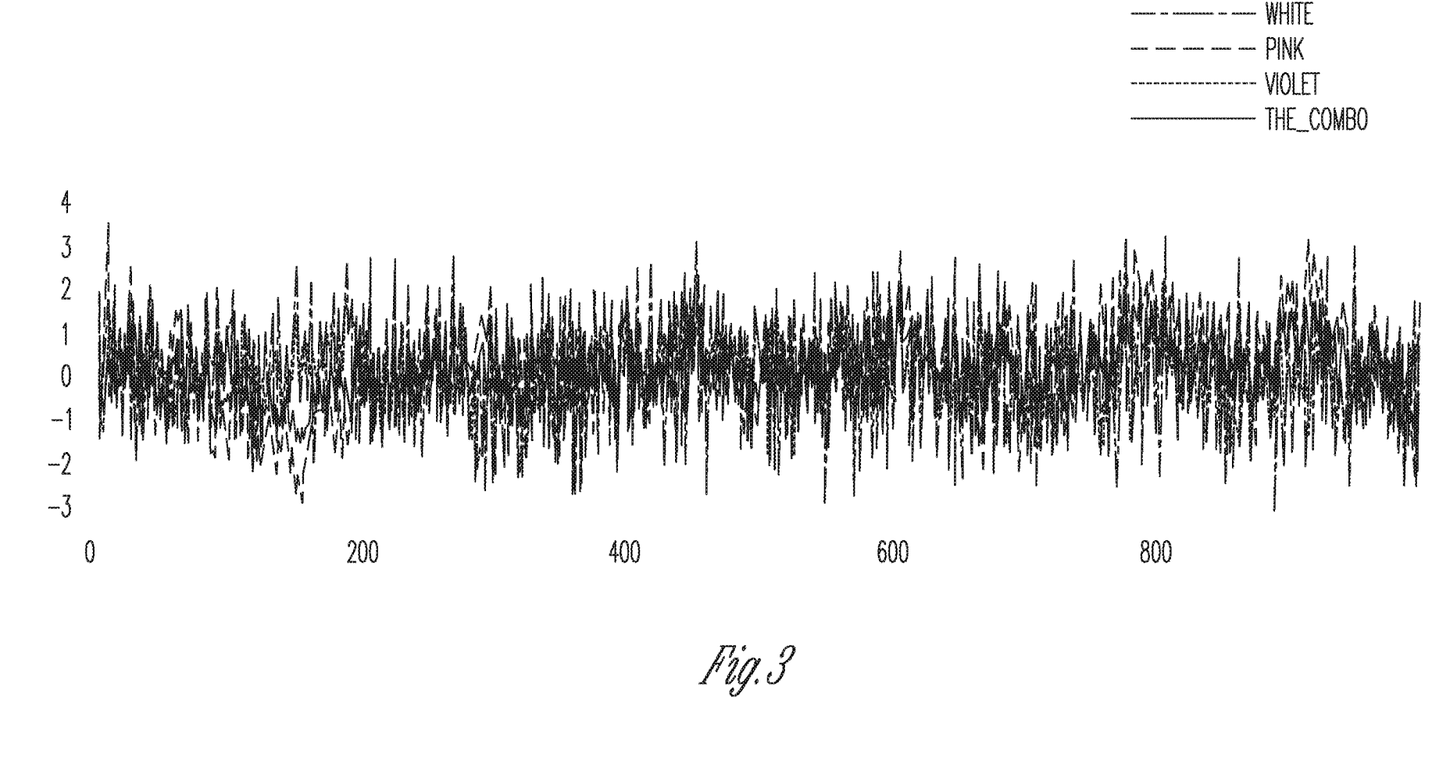
FIG. 3 is a graphical diagram illustrating an amalgamated random data set, according to an embodiment.

FIG. 3 is a graphical diagram illustrating an amalgamated random data set, according to an embodiment. The graph shows a combination of pink, white and violet noise, in one embodiment. FIG. 4A is a table illustrating a data set transformed using an artificial multispectral metadata generator, according to an embodiment. The data in column 402 were substituted with a random hexadecimal assignment, and in columns 404 were the output of a multispectral metadata generator of the present subject matter. A paired sample t-test was used to compare the original data to the artificial data output by the multispectral generator.

Figure 4B:
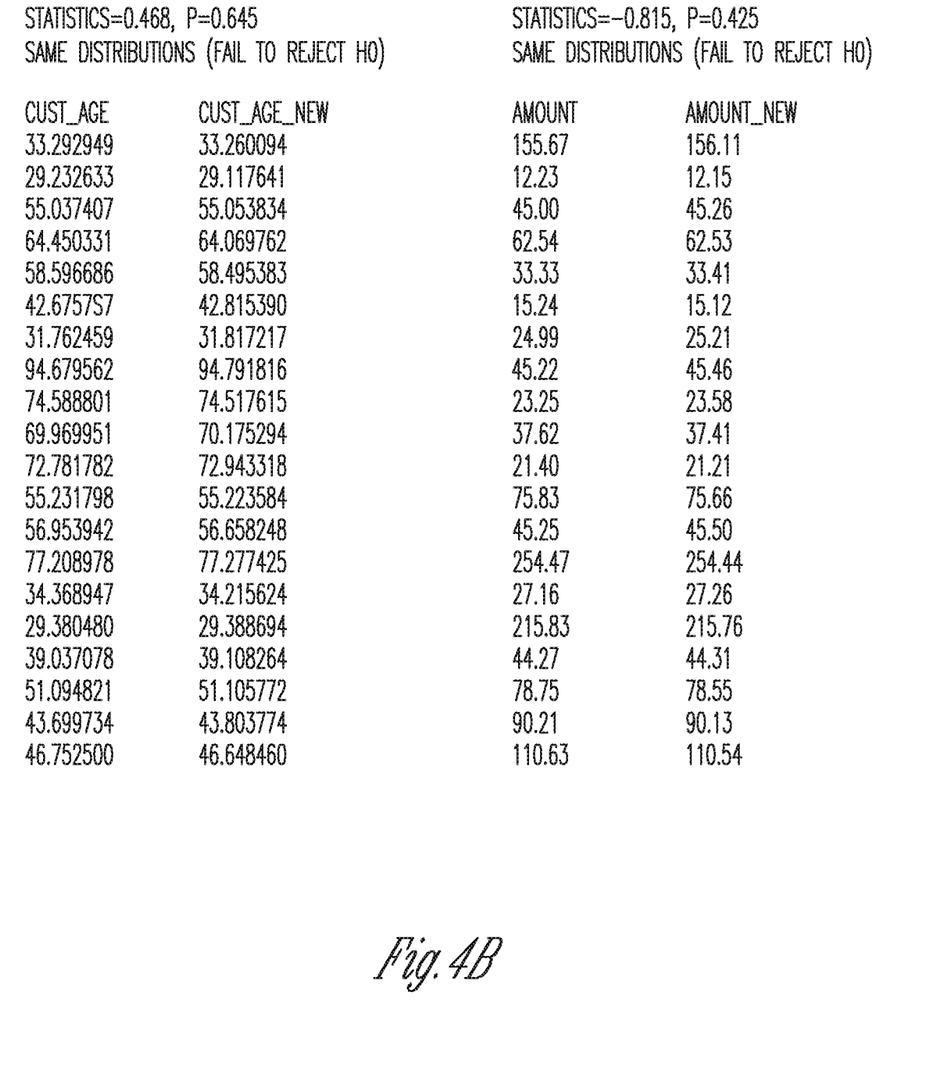

The paired t-test is a version of the t-test that takes into account the dependent nature of the samples. The null hypothesis of this test is that the difference between the means is zero, which implies that there is no difference between the distributions. If the p-statistic of the test result is lower than the chosen alpha level of the test (usually, set at 0.05), one can conclude that there is a large amount of evidence against the null hypothesis, rejecting the null hypothesis of "no difference" in the means and accepting the alternative hypothesis that the means are "not the same." If the p-statistic of the test comes out higher than the chosen alpha level, one can conclude that there is insufficient evidence against the null hypothesis, be unable to reject the null hypothesis and thus cannot say that there is a material difference between the samples—they are, for all practical purposes, "the same." In the present case, the artificial data is valuable if it can impart the same insights as the original dataset—it will be able to do so if it shares the same distributional traits. For the present subject matter, the distributions of the variables cannot be said to be materially different, given the evidence, and can therefore be said to be the same. Thus, as shown in FIG. 4B, since the distributions of the paired variables are the same, the artificial data generated using the methods of the present subject matter can be used as a proxy to elicit the same insights as the original data.

The present subject matter provides numerous benefits. For example, the present subject matter allows one to make use of the insights from internal sensitive data without directly using that sensitive data. In addition, the present subject matter benefits multiple lines of business, such as market research, investment research, and new lines of business. The present subject matter also protects and preserves data privacy, maintaining the highest ethical and legal standards. Further, the present subject matter provides a cost savings by providing an alternative to the purchase of transactional, alternative data from third party vendors, data that ranges in cost from hundreds of thousands to millions of dollars annually, and the data often coming with strings attached. In addition, the present subject matter retains the keys to data quality, such that the end user understands where the artificial data is coming from and thus can trust the insights, whereas a third party provider may not have the same standards of data quality.

Figure 5:
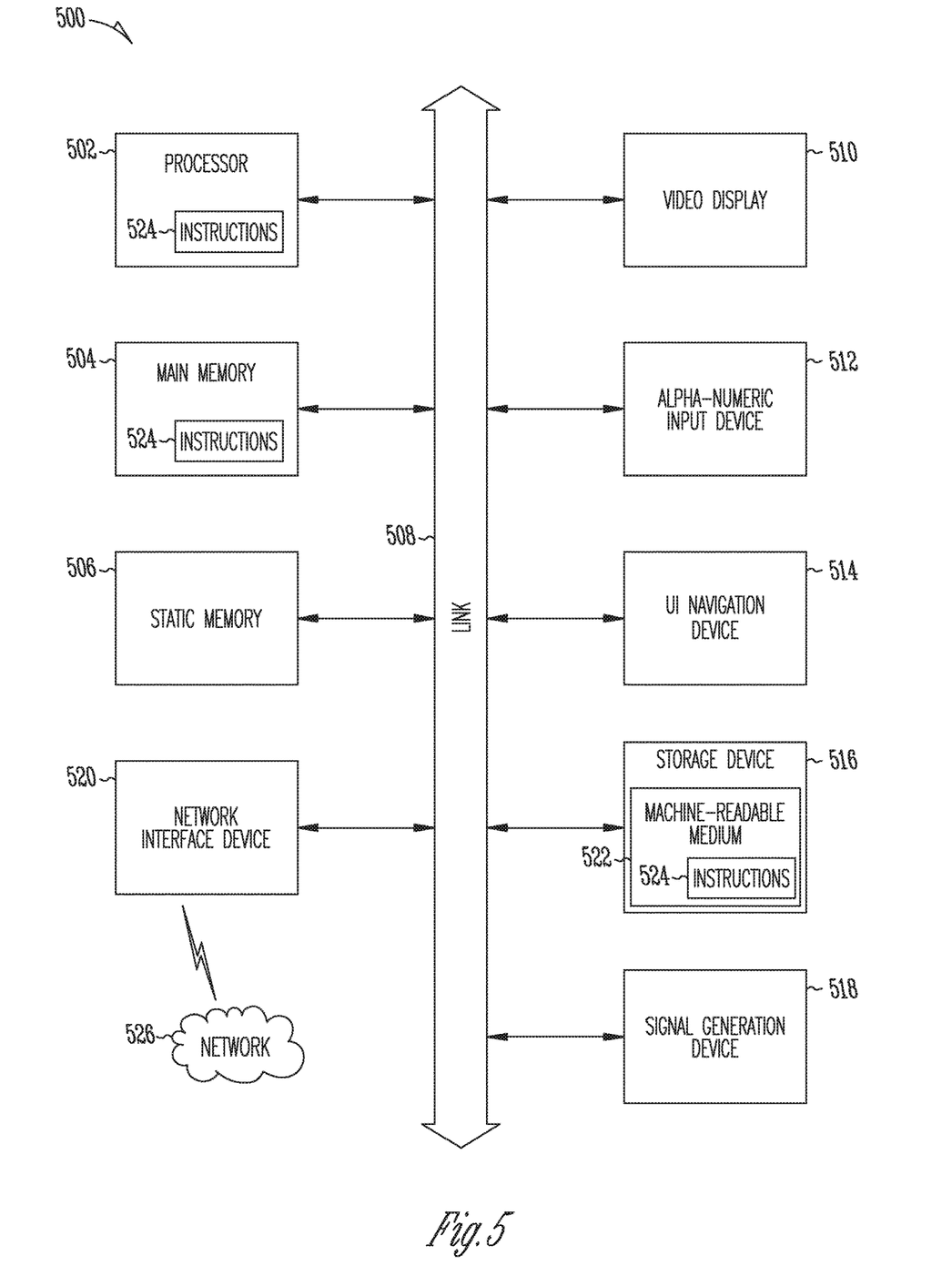
FIG. 5 is a block diagram of a machine in the example form of a computer system within which a set of instructions may be executed, for causing the machine to perform any one or more of the methodologies discussed herein.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile or cellular telephone such as a smart phone, a wearable device such as a smart watch, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The data storage device 516 includes a machine-readable medium 522 on which is stored one or more sets of data structures and instructions 524 (e.g., software) embodying or utilized by any one or more of the methodologies or functions described herein. The instructions 524 may include a machine learning system or algorithm, and may also reside, completely or at least partially, within the main memory 504, static memory 506, and/or within the processor 502 during execution thereof by the computer system 500, with the main memory 504, static memory 506, and the processor 502 also constituting machine-readable media.

While the non-transitory computer-readable storage medium 522 is illustrated in an example embodiment to be a single medium, the term "machine-readable medium" or "computer-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions (e.g., instructions 524) for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone system (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72 (b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer-implemented method comprising:
   receiving, by a computer system, an input data set;
   determining, by the computer system, attributes of the input data set to be transformed;
   for the attribute to be transformed, generating, by the computer system, three or more random noise sets, using at least two noise generation methods;
   creating, by the computer system, an amalgamated random set from the three or more random noise sets using a programmable ratio;
   randomly sampling, by the computer system, from the amalgamated random set to create a raw noise set;
   using, by the computer system, a standard deviation of the attribute to be transformed to create a noise base set;
   multiplying, by the computer system, the noise base set with the raw noise set to obtain a final noise set for the attribute to be transformed; and
   adding, by the computer system, the final noise set to the input data set to obtain an artificial data set.

2. The method of claim 1, wherein the at least two noise generation methods include a pink noise generator having a power spectral density per unit of bandwidth proportional to $1/f^\beta$, wherein $\beta$ is equal to 1.

3. The method of claim 1, wherein the at least two noise generation methods include a violet noise generator having a power spectral density per unit of bandwidth proportional to $1/f^\beta$, wherein $\beta$ is equal to 2.

4. The method of claim 1, wherein the at least two noise generation methods include a brown noise generator having a power spectral density per unit of bandwidth proportional to $f^\beta$, wherein $\beta$ is equal to 2.

5. The method of claim 1, further comprising using a random hexadecimal substitution to anonymize the attribute.

6. The method of claim 1, wherein randomly sampling from the amalgamated random set includes randomly sampling with replacement from the amalgamated random set.

7. The method of claim 1, further comprising using distributional attributes from the final noise set to gain insights from the input data set without having access to the input data set.

8. The method of claim 1, wherein creating the amalgamated random set from the three or more random noise sets using the programmable ratio includes using a Fibonacci number sequence.

9. A system comprising:
a computing system comprising one or more processors and a data storage system in communication with the one or more processors, wherein the data storage system comprises instructions thereon that, when executed by the one or more processors, causes the one or more processors to:
receive an input data set;
determine an attribute of the input data set to be transformed;
for the attribute to be transformed, generate three or more random noise sets, using at least two noise generation methods;
create an amalgamated random set from the three or more random noise sets using a programmable ratio;
randomly sample from the amalgamated random set to create a raw noise set;
use a standard deviation of the attribute to be transformed to create a noise base set;
multiply the noise base set with the raw noise set to obtain a final noise set for the attribute to be transformed; and
add the final noise set to the input data set to obtain an artificial data set.

10. The system of claim 9, wherein creating the amalgamated random set from the three or more random noise sets using the programmable ratio includes using a Fibonacci number sequence.

11. The system of claim 9, wherein randomly sampling from the amalgamated random set includes randomly sampling with replacement from the amalgamated random set.

12. The system of claim 9, further comprising using distributional attributes from the final noise set to gain insights from the input data set without having access to the input data set.

13. The system of claim 9, wherein the at least two noise generation methods include a pink noise generator having a power spectral density per unit bandwidth proportional to $1/f^\beta$, wherein $\beta$ is equal to 2.

14. The system of claim 9, wherein the at least two noise generation methods include a violet noise generator having a power spectral density per unit of bandwidth proportional to $f^\beta$, wherein $\beta$ is equal to 2.

15. The system of claim 9, wherein the at least two noise generation methods include a brown noise generator having a power spectral density per unit of bandwidth proportional to $1/f^\beta$, wherein $\beta$ is equal to 2.

16. A non-transitory computer-readable storage medium, the non-transitory computer-readable storage medium including instructions that, when executed by computers, cause the computers to perform operations of:
receiving an input data set;
determining an attribute of the input data set to be transformed;
for the attribute to be transformed, generating three or more random noise sets, using at least two noise generation methods;
creating an amalgamated random set from the three or more random noise sets using a programmable ratio;
randomly sampling from the amalgamated random set to create a raw noise set;
using a standard deviation of the attribute to be transformed to create a noise base set;
multiplying the noise base set with the raw noise set to obtain a final noise set for the attribute to be transformed; and
adding the final noise set to the input data set to obtain an artificial data set.

17. The non-transitory computer-readable storage medium of claim 16, further comprising using a random hexadecimal substitution to anonymize the attribute.

18. The non-transitory computer-readable storage medium of claim 16, wherein randomly sampling from the amalgamated random set includes randomly sampling with replacement from the amalgamated random set.

19. The non-transitory computer-readable storage medium of claim 16, further comprising using distributional attributes from the final noise set to gain insights from the input data set without having access to the input data set.

20. The non-transitory computer-readable storage medium of claim 16, wherein creating the amalgamated random set from the three or more random noise sets using the programmable ratio includes using a Fibonacci number sequence.

* * * * *